No. 818,507.
PATENTED APR. 24, 1906.
A. WOODWARD.
HAT PIN.
APPLICATION FILED JULY 17, 1905.
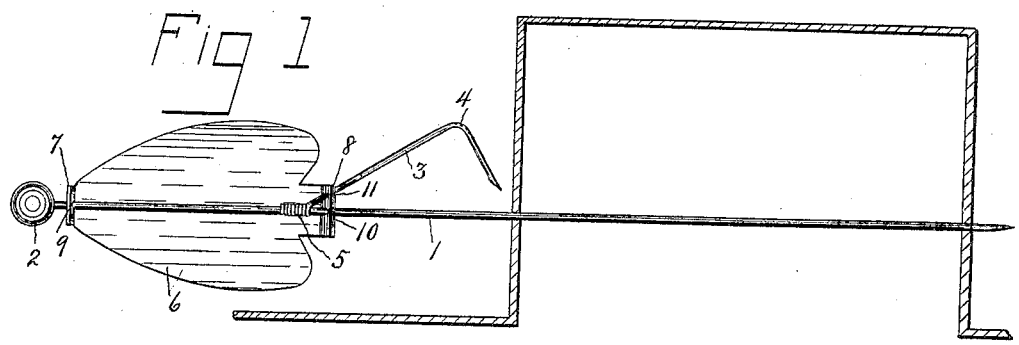
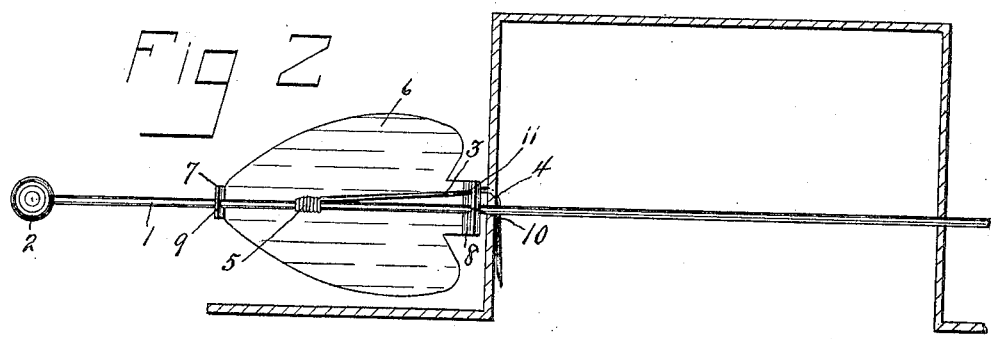
Witnesses
E. Edwin Lewis
F. Humm Talbot
Inventor
Anderson Woodward
by Shepherd & Parker,
Attorneys.

UNITED STATES PATENT OFFICE.

ANDERSON WOODWARD, OF LEEPER, MISSOURI, ASSIGNOR OF THREE-FOURTHS TO WILLIAM S. BAILEY, CHARLES M. HAMILTON, AND WILLIAM MONTGOMERY, OF LEEPER, MISSOURI.

HAT-PIN.

No. 818,507.   Specification of Letters Patent.   Patented April 24, 1906.

Application filed July 17, 1905. Serial No. 270,059.

*To all whom it may concern:*

Be it known that I, ANDERSON WOODWARD, a citizen of the United States, residing at Leeper, in the county of Wayne and State of Missouri, have invented certain new and useful Improvements in Hat-Pins, of which the following is a specification.

This invention relates to an improvement in pins, and especially to means for preventing the accidental removal of the same, the particular object of the invention being to provide a hat-pin with a retaining hook or guard adapted to engage a portion of the hat in which the pin is inserted, thereby effectively preventing its accidental removal.

A further object of the invention it to provide a hat-pin with retaining means for securely locking the same in place, the said means being wholly free from an unsightly appearance.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a vertical sectional view of a hat, showing the pin inserted and ready to be locked in position. Fig. 2 is a similar view showing the pin locked against displacement.

In the drawings, in which like numerals of reference designate corresponding parts throughout both views, 1 designates a hat-pin of the character now in common use having the usual head 2. Secured upon the pin 1 is a guard comprising the hook member 3, consisting of a pin formed of metal bent at a right angle at 4 and slidingly secured to the pin by a tight grasp of the spring-coils 5 and a sliding member or locking-plate 6, adapted to press the point of the hook member 3 into the body of the hat. The plate 6 is provided with two outstanding ears 7 and 8 at opposite ends of the same. These ears are provided with openings 9 and 10, through which the pin 1 passes. The ear 8 is provided with an additional opening 11 adjacent the opening 10 to accommodate the hook member 3, as shown. The plate 6 may be given the shape of a heart, as here illustrated, or any other ornamental configuration or design.

The operation of my improved guard is as follows: The pin with the hook member open, as shown in Fig. 1, is first inserted into the hat until the point of the hook member contacts therewith. The plate 6 is then pushed toward the hat, and in its movement it draws the hook member 3, which passes through opening 11, toward the pin 1, which passes through opening 10. When the ear 8 is brought into proximity with the outer bent portion of the pin 3, this portion will have been pressed into the hat and will occupy a position substantially perpendicular to the pin 1. The pin 1 is then pushed inward until the head 2 contacts with the ear 7. While in this position it is obvious that the pin cannot be accidentally removed. To prevent the accidental slipping of the plate 6 from the position shown in Fig. 2 to that of Fig. 1, I form the pin 3 of spring metal, as hereinbefore referred to, and so attach it to the pin 1 that it has a tendency to spring out of parallelism therewith. This spring tension serves to frictionally hold the guard 6 from transverse motion along the pin when the hook member is locked in position.

Having thus described my invention, what I claim as novel, and desire to secure by Letters Patent, is—

1. A pin provided with a guard comprising a pointed hook member adapted to lock the pin against accidental displacement, a plate having outstanding ears provided with openings through which the pin passes, one of said ears being provided with an opening through which the hook member passes, the parts being so disposed that a sliding movement of the said plate along the pin will force the hook member into locking engagement with the article within which the pin is to be secured against accidental displacement.

2. A pin provided with a pivoted hook member slidingly secured thereto, said member consisting of two portions bent at approximate right angles to each other, the point of the said member being normally in proximity to the pin, and means adapted to draw the portion of the hook member carrying the point into a position at approximately a right angle to the pin.

In testimony whereof I affix my signature in presence of two witnesses.

ANDERSON WOODWARD.

Witnesses:
 GEO. BERG,
 F. M. JOHNSON.